United States Patent [19]
Vasquez

[11] 3,797,859
[45] Mar. 19, 1974

[54] CARGO TIE-DOWN ATTACHMENT BRACKET

[76] Inventor: Richard A. Vasquez, 1905 S. Walnut St., San Gabriel, Calif. 91775

[22] Filed: Nov. 19, 1971

[21] Appl. No.: 200,402

[52] U.S. Cl. .......................... 280/179 R, 248/361 R
[51] Int. Cl............................................... B60p 7/00
[58] Field of Search..... 280/179 R, 179 A; 296/100; 248/475 R, 467, 361 R

[56] References Cited
UNITED STATES PATENTS

| | | | |
|---|---|---|---|
| 3,393,835 | 7/1968 | Kantor | 296/100 |
| 3,225,475 | 12/1965 | Shank | 248/467 |
| 3,368,785 | 2/1968 | Weiler | 280/179 R |
| 2,465,621 | 3/1949 | Wheeler | 280/179 R |

Primary Examiner—Robert R. Song
Attorney, Agent, or Firm—Boniard I. Brown

[57] ABSTRACT

A readily adjustable and removable cargo tie-down attachment bracket to be secured to a vehicle such as one side wall of the cargo space of a pick-up truck for securing an end of a cargo tie-down cord or the like. The bracket has a tension member such as a strap with anchor means such as a hook on one end for engaging a shoulder on the vehicle to releasably secure the strap end to the vehicle, hold-down means such as a suction cup on the other strap end for releasably holding the latter strap end against the vehicle, and a tie-down attachment member such as a hook on the strap to which the tie-down may be secured. The bracket may be readily moved from one location to another on the vehicle and removed from the vehicle when not in use.

3 Claims, 4 Drawing Figures

PATENTED MAR 19 1974 3,797,859
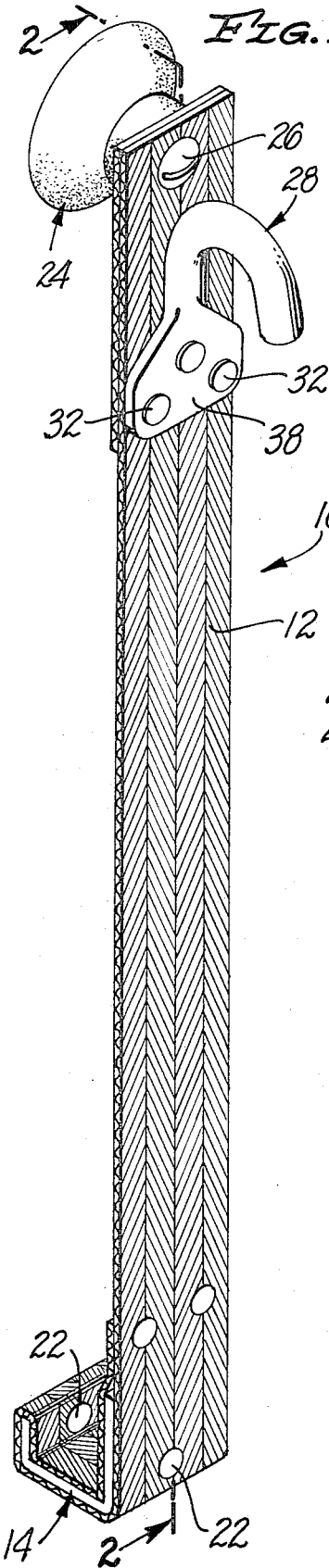
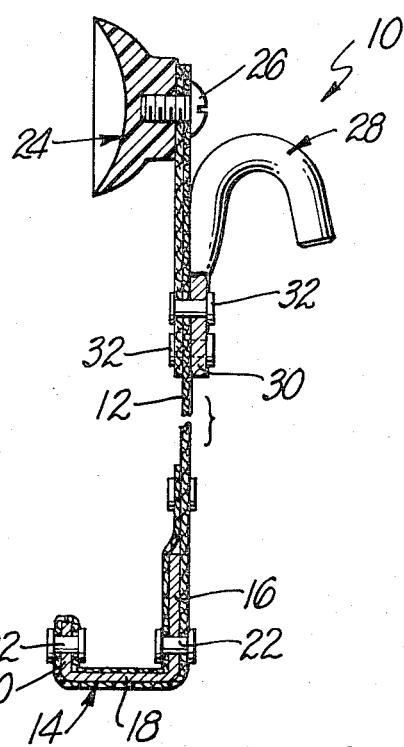
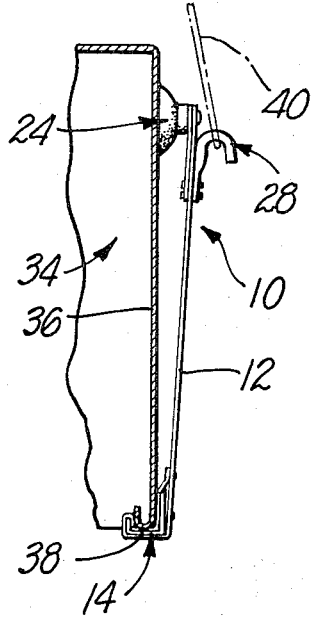
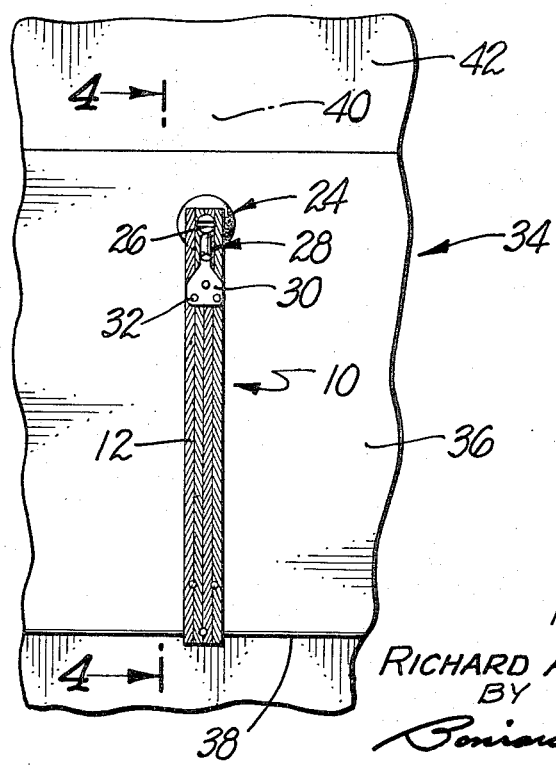
INVENTOR
RICHARD A. VASQUEZ
BY
Conrad G. Brown
ATTORNEY 3,797,859

CARGO TIE-DOWN ATTACHMENT BRACKET

BACKGROUND OF THE INVENTION

1. Field of the Invention

This invention relates generally to cargo tie-down devices for vehicles and more particularly to a novel adjustable and removable cargo tie-down attachment bracket for securing one end of a cargo tie-down to the vehicle.

2. Discussion of the Prior Art

Pick-up trucks and other vehicles often transport cargo which must be secured in position by means of tie-downs, such as cords, ropes or the like whose ends must be attached to the vehicle. Some vehicles are equipped with tie-down attachment means for this purpose. Examples of tie-down attachment means are found in the following U.S. Pat. Nos. 957,804; 1,699,290; 1,973,624; 3,154,026 and 3,378,889.

Many vehicles are not equipped with such tie-down attachment means. Also, those vehicles which are so equipped often require additional attachment means for proper lashing of the cargo.

SUMMARY OV THE INVENTION

The present invention provides a novel cargo tie-down attachment bracket which may be readily installed on and removed from a vehicle as well as moved from one location to another on the vehicle for anchoring or securing the end of a cargo tie-down to the vehicle. The bracket has a tension member such as a flexible fabric strap, with anchor means on one end for releasably anchoring or securing the strap end to the vehicle. On the other end of the strap is a hold-down for holding the latter strap end against the vehicle. A tie-down attachment member is secured to the strap adjacent its latter end for anchoring one end of a cargo tie-down. The tie down, when tensioned to secure the cargo, exerts on the bracket strap a pulling force which is resisted by the bracket anchor means.

In the disclosed embodiment of the invention, the tie-down bracket anchor means is a hook which projects beyond one side of the bracket strap for engaging a shoulder or other abutment on the vehicle. The strap material of the bracket covers the hook to prevent the latter from marring the vehicle. The hold-down means of the bracket is a suction cup on the side of the strap beyond which the anchor hook projects. The tie-down attachment member is a hook secured to the opposite side of the strap.

The disclosed tie-down bracket is installed on one side wall of the cargo space of a pick-up truck. The anchor hook of the bracket engages under the lower edge of the side wall, and the hold-down suction cup is secured to the outer side wall surface above the lower wall edge. The tie-down attachment hook is located on the outer side and adjacent the upper end of the bracket strap for anchoring attachment to one end of a tie-down extending over the cargo space.

BRIEF DESCRIPTION OF THE DRAWINGS

FIG. 1 is a perspective view of a present cargo tie-down attachment bracket;

FIG. 2 is a section taken along line 2—2 in FIG. 1;

FIG. 3 illustrates the bracket installed on a vehicle; and

FIG. 4 is a section taken on line 4—4 in FIG. 3.

DESCRIPTION OF THE PREFERRED EMBODIMENT

The illustrated cargo tie-down attachment bracket 10 has a tension member 12, in this case a strap, which is preferably a flexible fabric strap constructed of canvas or other fabric material with a high tensile strength. Secured to the lower end of the strap is an anchor means 14 in the form of a hook. Hook 14 has a generally L-shape and includes a leg 16 which parallels the strap 12 and a right angle leg 18 which extends normal to leg 16 beyond one side, hereafter referred to as the inner side, of the strap. The outer end of leg 18 turns upwardly to form a lip 20. The lower end of the strap 12 extends downwardly along the outer side of the hook leg 16, then under the leg 18, then upwardly around the lip 20, and finally inwardly along the upper side of leg 18 and upwardly along the inner side of leg 16. The strap thus covers the anchor hook and is secured to the hook by means of rivets 22. The upper end of the strap 12 has a double thickness, as shown.

On the upper end of the strap 12 is a hold-down means 24 in the form of a suction cup. Suction cup 24 is located at the inner side of the strap and is secured to the strap by a screw 26. At the outer side of the strap, adjacent its upper end, is a cargo tie-down attachment member 28. The illustrated attachment member is a hook having a base plate 30 secured by rivets 32 to the strap.

The drawings illustrate the tie-down attachment bracket 10 installed on a pick-up truck 34 having a rear cargo space with upstanding side walls 36 (only one shown). The side walls have lower shoulder edges 38. As shown in FIGS. 3 and 4, the bracket is located in a generally vertical attitude at the outer side of one side wall 36 with the lower bracket anchor hook 14 engaging under the lower side wall shoulder edge 38. The suction cup 24 is secured to the outer surface of the side wall above the shoulder edge to hold the upper end of the bracket strap 12 against the side wall. A cargo tie down 40, such as a rope, is secured at one end to the tie-down attachment hook 28, passes over the cargo 42 in the cargo space, and is secured at its other end to a tie-down attachment bracket (not shown) at the opposite side of the vehicle. It will be observed that the strap 12 provides a protective cover or sheath about the anchor hook 14 to prevent the latter from marring the vehicle.

What is claimed as new in support of Letters Patent is:

1. A readily adjustable and removable cargo tie-down attachment bracket for a vehicle comprising:

a tension member comprising a flexible strap, anchor means on one end of said member for releasably securing said member end to the vehicle to resist a pulling force on the other end of said member, said anchor means comprising a hook projecting beyond one side of said strap for engaging a shoulder on said vehicle, hold-down means comprising a suction cup on said one side of said other member end for releasably and slidably holding the latter member end against the vehicle, and a tie-down attachment hook element on the other side and adjacent said other end of said strap to which a tie down may be secured, said strap covering said anchor hook to prevent the latter hook from marring the vehicle.

2. In combination:

a vehicle, an adjustable tie-down bracket on said vehicle including a tension member comprising a flexible strap having an inner side facing the vehicle and an outer side, anchor means comprising a hook on one end of said member and projecting beyond said inner side of said strap and engaging a shoulder on said vehicle to releasably secure said member end to said vehicle, hold-down means comprising a suction cup on the inner side of the other strap end and engaging said vehicle to releasably and slidably hold the latter strap end against the vehicle, a tie-down attachment hook member on said outer side and adjacent said other end of said strap, said strap covering said anchor hook to prevent the latter hook from marring said vehicle, and said anchor meand and hold-down means being readily releasable from said vehicle to permit movement of said bracket from one location to another on said vehicle.

3. The combination according to claim 2 wherein:

said vehicle comprises a pick-up truck having a rear cargo space bounded by upstanding side walls with lower edges, and said bracket is located at the outer side of one side wall with said anchor hook engaging under the lower side wall edge and said suction cup secured to the outer side wall surface above said lower edge.

* * * * *